United States Patent Office 2,899,384
Patented Aug. 11, 1959

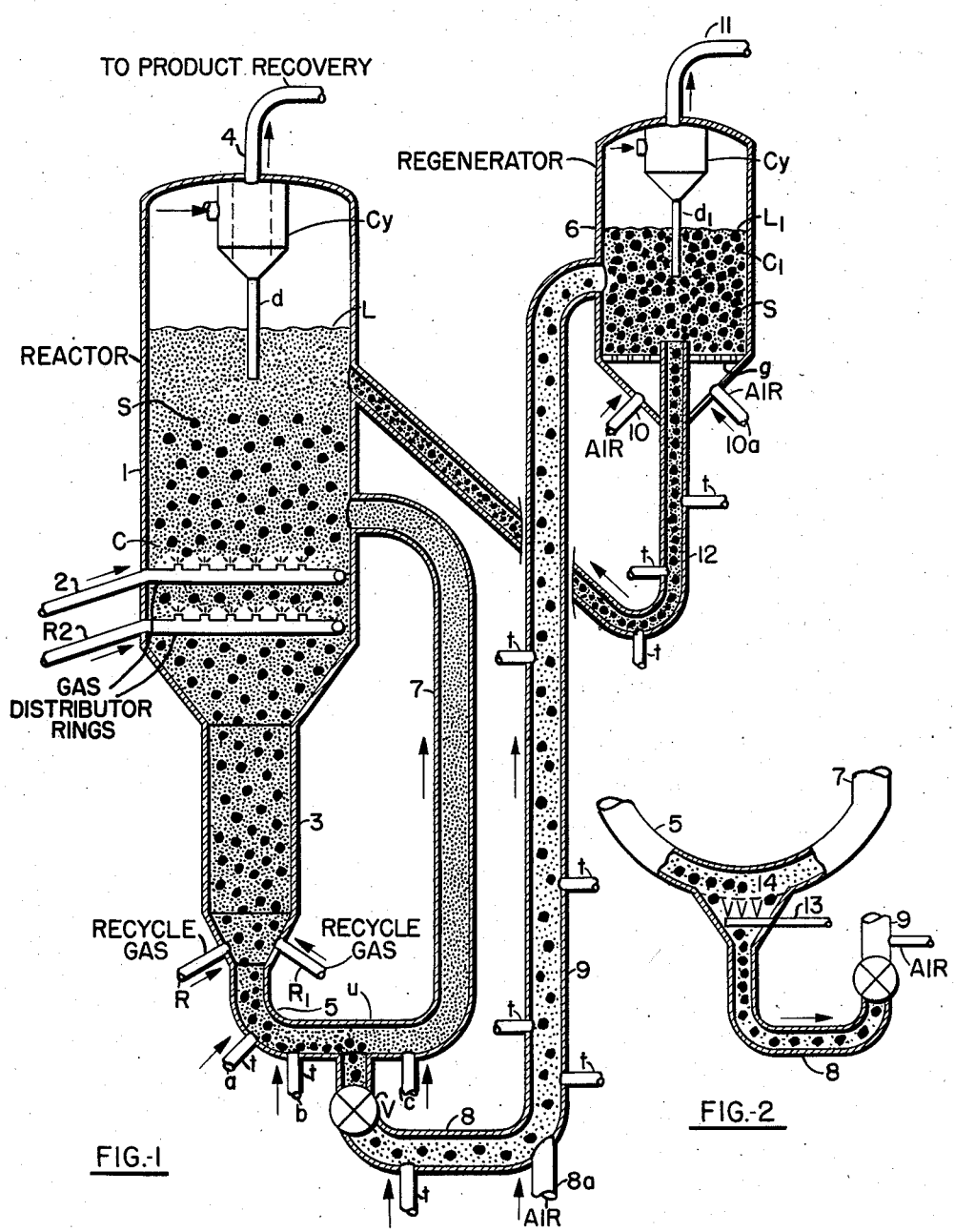

2,899,384

HYDROFORMING WITH THE USE OF A MIXTURE OF CATALYST AND INERT PARTICLES

Lawrence E. Swabb, Jr. and Worth W. Boisture, Baton Rouge, La., assignors to Esso Research and Engineering Company, a corporation of Delaware Application June 21, 1954, Serial No. 438,252

6 Claims. (Cl. 208—149)

The present invention relates to improvements in supplying heat to a process, particularly an endothermic process, such as hydroforming to maintain the process in heat balance. More particularly, the present invention relates to that type of process which is carried out in the presence of a fluidized bed of catalyst, which catalyst becomes contaminated in the process and, therefore, requires regeneration with an oxygen containing gas such as air with a consequent release of heat, and the present invention provides means for retaining this heat within the system to support the reaction, which may, as stated, be the hydroforming of naphthas.

The hydroforming of naphthas to produce a product of improved octane rating, boiling within the gasoline boiling range, is a matter of record and commercial practice. The early work done in this field employed the fixed bed of catalytic material. During the on-stream phase of this type of operation, the temperature drop through the reactor during the hydroforming operation was very large and the practice was to use a plurality of reactors operating in series with reheating between the stages.

More recently considerable research has been carried out in this country in an attempt to adapt the fluidized powdered catalyst technique to the hydroforming of naphthas. Such a process has the advantage over fixed bed operation in that it may be operated continuously, possesses flexibility, uniformity of temperature in the catalyst bed, provides greater exposed catalyst surface for contacting reaction vapors, and is otherwise more satisfactory than the fixed bed type of operation. In a two vessel system in which the hydroforming operation may conveniently be carried out employing the said fluidized catalyst technique, the hydroforming reaction may be performed in one vessel in the presence of the fluidized bed of catalyst, and the catalyst fouled in the hydroforming reactor may be continuously or intermittently withdrawn from the reactor and conducted to the regeneration zone where it is regenerated and returned to the reactor zone. In the fixed bed type of operation it was, of course, necessary to discontinue the productivity phase of the hydroforming process and to treat the fouled catalyst with a regeneration gas to reactivate the catalyst.

Hydroforming is an operation in which virgin naphtha, cracked naphtha, synthetic naphtha or a mixture of these is contacted at elevated temperatures and pressures with a solid catalytic material in the presence of hydrogen. The process is so operated as to avoid consumption of hydrogen and usually there is a net production of hydrogen. As to operating conditions in hydroforming, a temperature is maintained in the reaction zone which is within the range from about 750° to 1050° F., a pressure is obtained in said zone from about 50–1000 lbs. per sq. in. and for each barrel of oil fed to the reaction zone there is also fed a recycle gas in an amount from about 2000–7000 std. cu. ft., the said recycle gas having a concentration from about 50–90% hydrogen.

The catalysts employed in hydroforming naphthas include metals such as platinum or palladium suitably supported and also the oxides and sulfides of certain other metals, particularly, molybdenum, chromium, vanadium, and tungsten also suitably supported. A good support for these metals, oxides, and sulfides is an active form of alumina which must possess an adsorptive or high surface area. A satisfactory base or carrier is alumina which contains a major portion of eta form of alumina.

The present invention is mainly directed toward efficient means for supplying heat to the hydroforming zone. In the past, it has been proposed to accomplish this by preheating the feed oil, by preheating the hydrogen-containing recycle gas, and by transferring hot catalyst from the regenerator to the reaction zone. All of these methods have certain undesirable features. The amount of heat that can be added by preheating the feed oil is very strictly limited because this feed invariably contains a substantial quantity of naphthenes, which naphthenes are subject to degradation to products consisting of carbon and dry gas, if the feed is heated to a temperature higher than about 850°–1000° F. With respect to the recycle gas it is pointed out that this material is obtained from the product recovery system at a temperature of about 100° F. To reheat this material to a temperature of 1100°–1400° F. is an expensive and undesirable step. In addition, the heavier hydrocarbon components of the recycle gas undergo thermal degradation to products consisting of carbon and dry gas with subsequent loss of valuable products at temperatures of 1200° F. or higher. And with respect to the catalyst, it can not be regenerated at a temperature in excess of about 1150° F. without injuring the catalyst, and consequently, in the prior practice, cooling means have been employed in the regeneration zone to abstract excess heat from the catalyst and from the system. Hydroforming is unlike the catalytic cracking operation carried out according to the fluidized solids technique because ample heat may not be transferred from the regenerator to the reaction zone by utilizing a high catalyst circulation rate as is done in the cracking operation, namely, one in which 10–20 parts by weight of hot catalyst are charged to the cracking zone with each part by weight of feed oil. Such catalyst circulation rates cannot be utilized in hydroforming naphthas since catalyst to oil ratios in excess of about 1:1 cause excessive carbon formation and yield product distributions which are economically unattractive.

In brief compass, the present invention comprises transferring essentially all of the heat released in the regenerator to the hydroforming zone through the agency of a circulating heat transfer material or shot, such as mullite. Of course, other materials may be used as heat transfer material such as sand, silica gel, and various metals. Preferably, however, the shot is a material which is an inert substance, having a larger average particle size than the catalyst and possessing a higher bulk and fluidized density than the catalyst. It must also be resistant to attrition and be able to withsand physical disinegration and fragmentation when utilized in the form of a dense, turbulent, fluidized bed. Others have proposed the use of a circulating powdered inert heat transfer material. By using a heat transfer material that is larger and denser than the catalyst, the holdup of the inert material in the reaction zone is very low, and the volume of the reaction zone necessary for a given degree of reaction is little affected by the presence of the small amount of heat transfer material. The present invention embodies an improvement over prior practice and proposals in that means are provided for varying the weight ratio of shot and catalyst in the circulating stream and thereby varying the rate at which the heat is transferred to the reaction zone by the heat transfer material. This flexibility in heat transfer to the reactor is highly desirable in hydroforming to permit the use of a wide range of unit operating conditions in order that various degrees of conversion can be accomplished. In addition, certain naphthas require more severe conditions during hydroforming thereof and must be treated in a manner to supply more heat to the reaction zone. The present invention provides means for adding any desired amount of heat to the reaction zone by varying the rate at which the hot shot is fed thereto. As previously indicated, the shot material in the present improved process is mullite, a material having the formula $2SiO_2.3Al_2O_3$, which material is procured preferably in the form of microspheres, having an average particle size in the range of 300–700 microns. This material has a particle density of about 195 lbs. per cu. ft. and a bulk density of about 115 lbs. per cu. ft. On the other hand, the catalyst normally employed in hydroforming has a much smaller average particle size and density. For example, a typical hydroforming catalyst comprising about 10 wt. percent of molybdenum oxide and 90 wt. percent alumina normally has an average particle size of about 60 to 80 microns, and has a particle density of about 60 to 110 lbs. per cu. ft. with a bulk density of about 40 to 55 lbs. per cu. ft.

According to previous proposals the shot and catalyst were circulated from the reaction zone to the renegeration zone and recycled after regeneration to the reaction zone, in cocurrent flow. An increase in the concentration of the shot resulted from the tendency of heavy shot particles to settle through the less dense fluidized bed in the reaction zone. As a result of this concentration tendency, the shot to catalyst ratio in such a circulating stream may be further increased by causing a mixture to pass through a conduit of gradually diminishing cross sectional area. The present invention provides a means whereby the shot concentration may be still further increased and the weight ratio of shot and catalyst on the circulating solids stream may be easily controlled.

The present invention also embodies an improvement over previous practice and proposals in that means are provided to prevent the separation of shot and catalyst in the bottom of the reaction zone and solids transfer system when there is a stoppage in circulation to the regeneration zone. In the prior practice, a stoppage in solids circulation brought about by upset conditions, pressure surges in the system, or failure of mechanical equipment would result in extremely high shot concentration in the bottom of the reactor and in the solids transfer system up to the circulation control valve. This mass of nearly pure shot is difficult to move to initiate circulation. However, by the present invention, a mixture of shot and catalyst is continuously recycled from the bottom of the reactor back to the reaction zone. The circulation control valve is located adjacent to this recirculating stream and a stoppage in solids circulation to the regenerator results in practically no accumulation of pure shot in the transfer system.

An object of the present invention is to improve the hydroforming operation carried out employing the fluidized catalyst technique by adding heat to the reaction zone by means which are more efficient and cheaper than those proposed heretofore.

Another object of the present invention is to maintain a fluidized catalyst hydroforming system comprising a reaction zone and catalyst regeneration zone in heat balance by adjusting the rate of transfer of heat from the regenerator to the reaction zone through the agency of a circulating heat transfer material which is circulated at a rate responsive to the heat requirements in the reaction zone.

Another object of the present invention is to provide means for controlling the rate of heat transfer from a regeneration zone to a reaction zone by controlling the weight ratio of shot and catalyst in the circulating solids stream.

Another object of the present invention is to provide means for circulating an inert heat carrying material or shot from a regeneration zone to a reaction zone, both zones containing fluidized beds of catalyst so as to provide in the circulating solids stream a weight ratio of shot to catalyst which may be as high as 7 or higher, preferably 2 to 10.

Another object of the present invention is to provide means for preventing the complete separation of shot and catalyst in the bottom of the reactor when the solids circulation to the regenerator is stopped for some reason.

In the accompanying drawing there is depicted in Figure 1 the essential apparatus of a two-vessel hydroforming system comprising a reaction zone and a regeneration zone and transfer lines connecting the two zones to provide circulation means of catalyst and shot to and from the said zones and also means for increasing and controlling the weight ratio of shot to catalyst in the circulating stream; and in Figure 2 there is depicted a fragmentary showing of a modification of the apparatus illustrated in Figure 1.

Similar reference characters refer to similar parts in the views.

Referring in detail to Figure 1, 1 represents a reactor vessel containing a fluidized bed of hydroforming catalyst C and shot or heat transfer material S. Preheated oil such as a virgin naphtha containing 30–40 vol. percent of naphthenes, which naphtha boils substantially within the range of from about 200°–400° F., is fed to the reactor through line 2. Simulaneously recycle gas (i.e., $H_2$ containing gas) obtained from a product recovery system (not shown) is charged via lines R and $R_1$ to the well 3 positioned as shown in the bottom of vessel 1. This gas passes upwardly through the well 3 into the bed C. Additional recycle gas is charged from line $R_2$. Under known conditions of temperature, pressure, amount of recycle gas, and residence time, the desired hydroforming reaction occurs in bed C and the vaporiform product emerges from bed C and passes through a solids disengaging space positioned between L and the top of the reactor, in which disengaging space the main portion of entrained solids gravitate from the vaporiform material toward the bed C. Before the raw product is withdrawn from the reactor, it is customary and desirable to force it through one or more gas-solids separating devices $C_y$, commonly called "cyclones" to separate from the products fines still entrained therein and to return the fines to the bed C through one or more dip pipes $d$. The product emerges from the reactor overhead through line 4 and is conducted to a product recovery system where it is treated by conventional means to obtain the desired hydroformate and also to recover a recycle gas for reuse in the process occurring in reactor 1.

As previously indicated, during the hydroforming operation, the catalyst acquires contaminating deposits which impair its activity. These deposits are primarily carbonaceous in nature, and in the case where the feed contains substantial amount of sulfur in some form, at least a portion of this sulfur is also deposited on the catalyst. To reactivate and regenerate the catalyst, it is withdrawn from the reaction zone and transported to a second vessel comprising a regeneration zone where it is subjected to oxidative regeneration to remove the contaminating deposits and thus to purify and restore the activity of the catalyst. Toward this end a mixture of catalyst and heat transfer material is withdrawn from the bottom of well 3 through line 5 which, as shown, contains a U-bend and then passes upwardly through riser 7 leading into the bed C of the reactor 1. Due to the fact mainly, that the heat transfer material or shot is more dense, and on the average larger than the catalyst, the said heat transfer material or shot tends to concentrate against the lower wall of the U-bend portion of line 5. The less dense, and smaller on the average catalyst, on the other hand, concentrates toward the upper wall of the U-bend in line 5 and is carried in a lift gas charged to line 5 via pipes $a$, $b$, $c$ and $d$ to bed C in reactor 1. The shot, on the other hand, which has accumulated against the lower wall position of the U-bend is withdrawn therefrom through a valved line 8 in communication with the said U-bend and carried in a gas, which may be air, charged via a main supply line 8a to a point at or near the bottom of a riser leg 9 into the regenerator 6. A plurality of gas inlet taps $t$ are located at spaced points, as shown, to supply additional fluidizing and lifting gas. Since the withdrawn shot and catalyst in line 8 and riser 7 contains adsorbed and/or occluded hydrocarbons and hydrogen, it is preferable to subject this mixture to the influence of purging or stripping gas, such as steam to dislodge said hydrocarbons and hydrogen. This can be accomplished in an outside conventional stripper (not shown). The separation of catalyst from the shot in U-bend in line 5 may be controlled by adjusting the aeration rates through the bleed taps $a$, $b$ and $c$ in U-bend. The separation between catalyst and shot effected in the U-bend is not complete and a substantial quantity of catalyst is carried into the regenerator with the shot. However, a substantial portion of the catalyst charged to line 5 is reurned to the reactor via riser 7 so that the concentration of catalyst is much less in regenerator 6 than it is in reactor 1. The concentration of shot in regenerator 6 is much greater than that in reactor 1 and as presently will appear, this catalyst and shot mixture is recycled to the reactor after treatment with air. Thus, conditions are adjusted so that the catalyst circulation rate from the regenerator to the reactor is about one part by weight of catalyst per part by weight of oil fed to the reactor, but the shot circulation rate may be from 2 to 10 parts by weight of shot per part by weight of oil fed to the reactor.

Referring again to regenerator 6, secondary air may be fed to the regenerator through inlet pipes 10 and 10a. The mixture of solids in the regenerator 6 is formed into a dense fluidized bed $C_1$ extending from a grid or screen G at near the bottom of the regenerator to an upper dense phase level $L_1$. Under known conditions of temperature, pressure, and residence time, the deposits formed on the catalyst and shot are consumed by combustion and the fumes emerge from the bed $C_1$ and pass through a disengaging space disposed between $L_1$ and the top of the regenerator. As usual, the fumes about to emerge from the regenerator are forced through one or more cyclones $C_y$ for the purpose of removing entrained fines, which removed fines are returned to the bed $C_1$ through dip pipes $d_1$. The regeneration fumes are withdrawn from the regenerator through line 11 and they may be treated to recover, for use in the present system or other places, their chemical and sensible heat content, utilizing conventional equipment (not shown). The treated solids are withdrawn from the regenerator through a standpipe 12 and returned to the bed C in reactor 1 at a point near the top of bed C to permit the shot to settle through the bed to add heat to the endothermic reaction occurring therein. The shot settles rapidly through the catalyst bed C in reactor 1 due to the much larger average particle size of the said shot. In other words, the shot gravitates, as stated, through the bed, giving its heat to the catalyst bed. Since the solids mixture circulated to and from the regenerator 6 has a high shot concentration, the shot circulates between the two vessels at a much greater rate than does the catalyst, as previously indicated.

Figure 2 depicts a modification of draw-off equipment shown in Figure 1. It will be noted that in this modification the U-bend in line 8 does not open directly to the recirculating U-bend in line 5 as in Figure 1. As shown in Figure 2 a section of the bottom of the U-bend in line 5 would be replaced with a pierced plate 14 below which a means of injecting gas 13 would be provided. The amount of gas fed through line 13 may be adjusted to vary the pressure drop through the orifices in plate 14 and by this means to provide additional separation of the heavier shot particles from the catalyst, since the lighter catalyst particles would not have as great a tendency to settle through the orifices as would the shot. This arrangement would have the further advantage of evenly distributing aeration gas over a large section of the U-bend bottom, thus improving the operability of said U-bend.

It will be noted that the U-bend in line 5 and riser 7 permit a continuous recirculation of the shot and catalyst mixture back to the reactor whenever the control valve V on U-bend in line 8 is closed. This is particularly advantageous when it is desirable to stop the solids circulation to the regenerator for some reason. In this arrangement no adjustments to the aeration in the solids transfer system is required upon the resumption of solids circulation to the regenerator because the shot concentration in the U-bend in line 5 has remained substantially unchanged throughout.

To recapitulate briefly, the present invention relates to a method of maintaining a two-vessel system employing fluidized catalyst or fluidized solids in heat balance and has particular reference to an operation in which the net effect of the chemical reactions involved in endothermic in nature, the vessels employed comprising a reactor zone and a catalyst regeneration zone or a solids reheat zone, the latter providing a substantial portion of the heat necessary to support the reaction through the agency of circulating hot solids from the regenerator or the heater to the reaction zone, responsive to the heat requirements in said reaction zone. While this invention has been described with reference to a hydroforming process, it is understood that it may be utilized in connection with other processes as the coking of petroleum heavy oils, the carbonization and/or gasification of carbonaceous material such as coal, or it may be used effectively in distillation of oil sands, char, etc.

Example

A virgin naphtha boiling within the range of 200°–350° F. and containing 30 to 40 vol. percent naphthenes and having an octane number of 50 was treated in the presence of a fluidized bed of hydroforming catalyst consisting of 10 wt. percent molybdenum oxide and 90 vol. percent alumina at 900° F., and under the pressure of 200 lbs. per sq. in. oil, while charging 4500 cu. ft. of recycle gas containing 55% $H_2$ per barrel of oil to the reaction zone. The catalyst had an average particle size of 20–80 microns. The superficial gasiform linear velocity in the reaction zone was 0.4 ft. per second. The ratio of catalyst to oil fed to the reaction zone was 0.9 lb. of catalyst per lb. of oil. The preheat temperature of the oil was 940° F., that of the recycle gas was 1050° F., and a mixture of shot and catalyst was fed to the reaction zone, the mixture being at a temperature of about 1000° F. and containing about 7 lbs. of shot per each lb. of catalyst.

A hydroformate having an octane number of 95 was obtained in 80% yield of liquid product.

It will be understood, of course, that the foregoing example is not to be construed as placing any limitation on the invention, for it is merely illustrative. Thus catalyst other than molybdenum oxide and alumina may be used, including metals such as platinum or palladium carried on alumina or other support. Also, metal oxide such as chromium oxide may be used as the active component for the hydroforming catalyst. The temperature in the reaction zone may vary from 875°–1050° F., the pressure may vary from 100–500 p.s.i., the recycle gas fed to the reaction zone may vary from 500–6000 cu. ft. of 60–75% hydrogen per barrel of oil, and the catalyst to oil ratio may vary from 0.5–1.1 lbs. of catalyst per lb. of oil. The preheat temperature of the oil may vary from 600–950° F., and the preheat temperature of the recycle gas may vary from 1000–1400° F. It is also within the compass of this invention to hydroform a large variety of stocks, such as stocks containing ½% by weight of sulfur or more, stocks which contain substantial quantities of olefinic hydrocarbons and stocks which contains as low as 15% naphthenes, the remainder being paraffinic hydrocarbons. The process of the present invention is particularly suitable for treating sulfur stocks which cannot be handled efficiently using a noble metal catalyst, such as platinum, thus an important feature of the present invention is its capability of hydroforming naphthas, utilizing relatively low recycle gas rates such as set forth in the foregoing example, and at the same time merely heating the recycle gas to a temperature of around 1000° F., which avoids degradation of the hydrocarbons in the recycle oil and permits heating of the recycle gas and the feed oil in the unitary system in admixture with each other rather than having separate heating means for the oil and the recycle gas were it necessary to heat the recycle gas to temperatures of the order of, say, 1400° F., which heating is required in the absence of the use of hot shot.

Many modifications of the present invention may be made with those who are familiar with the art without departing from the spirit thereof.

What is claimed is:

1. The method of supplying a major portion of the heat required for hydroforming naphthas to the hydroforming reaction zone in a system comprising a hydroforming zone containing a fluidized bed of finely divided catalyst, a regeneration zone containing a fluidized bed of finely divided catalyst and transfer lines connecting the said hydroforming zone and said regeneration zone which comprises fluidizing the finely divided catalyst and shot particles having a higher density and larger average particle size than the catalyst in the hydroforming reaction zone by the passage of gasiform reactant material upwardly through said zone, passing fluidized catalyst and shot downwardly through a well of reduced cross-sectional area disposed at the bottom of the hydroforming zone, introducing recycle gas near the bottom of said well and causing said recycle gas to flow upwardly through said well at a sufficient velocity to gas lift catalyst from said well into the bottom of the fluidized bed of catalyst in the reaction zone whereby the relative proportion of shot to catalyst in said well is increased, discharging the resultant mixture of shot and catalyst from the bottom of said well in the form of a confined stream of restricted cross-sectional area, passing said mixture downwardly, then with changing direction to a region of flow reversed wherein at its lowermost point a first mixture rich in shot particles is concentrated and a second mixture lean in shot is concentrated above the first mixture, passing said second mixture as a confined stream with changing direction then upwardly to complete a U-shaped path of reversed flow to the upper portion of the dense bed in the hydroforming reaction zone, withdrawing said first mixture rich in shot downwardly from said lowermost point of flow reversal and passing said mixture in the form of a confined stream into the regeneration zone, maintaining in the regeneration zone a higher ratio of shot to catalyst than exists in the hydroforming zone, subjecting the mixture to oxidative regeneration and returning a highly heated mixture of shot and catalyst to the hydroforming zone.

2. The method set forth in claim 1 in which the volume of shot in the hydroforming zone amounts to about 2–3 volume percent of the total bed of catalyst and shot.

3. The method set forth in claim 1 in which the ratio of shot to catalyst in the regeneration zone and the transfer line, through which catalyst flows from the regenerator the reactor is of the order of about 2–10 parts by weight of shot per weight of catalyst.

4. The method set forth in claim 1 in which the shot is a substantially inert material having an average particle size of from about 300–700 microns and the catalyst has an average particle size of from about 60–80 microns.

5. The process defined by claim 1 in which a fluidizing gasiform material is introduced into the said first confined stream at the said lowermost point of flow reversal thereby further increasing the shot to catalyst ratio of the said first mixture.

6. The process defined by claim 1 including the steps of discontinuing withdrawal of said first mixture during periods of flow stoppage at the regeneration zone, passing said first mixture with said second mixture back into the upper portion of the hydroforming zone and continuing said circulation of shot and catalyst until normal operation of the regeneration zone is resumed.

References Cited in the file of this patent

UNITED STATES PATENTS

| | | |
|---|---|---|
| 1,023,750 | Morscher | Apr. 16, 1912 |
| 2,446,247 | Scheineman | Aug. 3, 1948 |
| 2,658,860 | Welty | Nov. 10, 1953 |
| 2,721,167 | Nicholson | Oct. 18, 1955 |
| 2,763,595 | Fritz | Sept. 18, 1956 |
| 2,763,596 | Feldbauer et al. | Sept. 18, 1956 |